United States Patent [19]

Numata et al.

[11] 4,242,365

[45] Dec. 30, 1980

[54] PROCESS FOR PRODUCING FRIED BANANA SLICES

[75] Inventors: Masayuki Numata, Fujisawa; Kenji Sugano, Tokyo, both of Japan

[73] Assignee: Meiji Seika Kaisha, Ltd., Tokyo, Japan

[21] Appl. No.: 74,622

[22] Filed: Sep. 12, 1979

Related U.S. Application Data

[63] Continuation of Ser. No. 924,012, Jul. 11, 1978, abandoned.

[30] Foreign Application Priority Data

Jul. 11, 1977 [JP] Japan ................................ 52-81934

[51] Int. Cl.³ ............................................ A23L 1/212
[52] U.S. Cl. .................................. 426/438; 426/445; 426/615
[58] Field of Search ............... 426/615, 438, 441, 445, 426/466, 417; 99/355, 403, 410, 472

[56] References Cited

U.S. PATENT DOCUMENTS

| | | | |
|---|---|---|---|
| 3,510,314 | 5/1970 | Lima et al. | 426/438 X |
| 3,573,937 | 4/1971 | Sarna | 426/441 |
| 3,718,485 | 2/1973 | Lankford | 426/438 |
| 3,821,449 | 6/1974 | Swisher | 426/438 |

*Primary Examiner*—Arthur L. Corbin
*Attorney, Agent, or Firm*—Sughrue, Rothwell, Mion, Zinn and Macpeak

[57] ABSTRACT

A process for producing a dried banana product having a crisp texture and good storage stability comprising:

frying slices of fully ripe raw banana flesh in an edible oil as rapidly as possible after slicing while substantially maintaining a pressure of about 30 to about 60 Torr and a frying temperature of about 75° to about 85° C.;

removing the banana flesh slices from the frying oil while still maintaining a pressure of about 30 to about 60 Torr;

removing the excess frying oil adhering to the banana slices while still maintaining a pressure of about 30 to about 60 Torr; and thereafter restoring the pressure to atmospheric pressure. No anti-browning treatment is required.

2 Claims, No Drawings

PROCESS FOR PRODUCING FRIED BANANA SLICES

This is a continuation of application Ser. No. 924,012, filed July 11, 1978, now abandoned.

BACKGROUND OF THE INVENTION

1. Field of the Invention

This invention relates to a process for producing a dried banana product, and more specifically, to a process for producing a dried banana product having a crisp texture and good storage stability by frying slices of fully ripe raw banana flesh in an edible oil under reduced pressure thereby to dehydrate the banana flesh.

2. Description of the Prior Art

Fully ripe raw banana flesh generally comprises, by weight, 75.5% water, 1.3% protein, 0.4% lipid, and 21.4% carbohydrate. About 90% of the carbohydrate comprises sucrose and reducing sugars, and starch accounts for about 2% of the entire banana. In addition to these components, ripe raw banana flesh contains some amount of crude fiber, ash and organic acids and small amounts of inorganic substances, vitamins, pigments, tannins, and enzymes.

Drying of ripe raw banana flesh having such a composition is limited in many ways. For example, since the flesh contains a large amount of sucrose and reducing sugars, the flesh has a low water activity. This makes dehydration of the flesh difficult, and long periods of time are required for drying the flesh. Consequently, browning of the banana flesh occurs due to the presence of a group of enzymes such as polyphenoloxidases, and peroxidases, and the quality of the ripe raw banana is reduced.

In conventional methods for producing dried banana products, therefore, the usual practice is to inhibit the activities of these enzymes by immersing the banana flesh in a solution of $SO_2$ or another sulfur dioxide generating agent or a solution of a browning inhibitor such as ascorbic acid. A blanching treatment with hot water or steam is another conventional means of inhibiting browning.

Ripe fruit inherently has a larger moisture content than unripe fruit, and contains less starch and crude fiber and more sugars. Thus, the texture of ripe fruit is soft and weak. When the ripe banana flesh is subjected to a blanching treatment, the water content of the flesh is increased, and therefore, the texture of the ripe banana flesh is further softened. Hence, subsequent handling of the banana flesh in drying causes crumbling or deformation of the ripe banana flesh to occur.

It is extremely difficult to dry slices of ripe raw banana flesh while retaining their shape. For this reason, according to conventional techniques, a dried banana product generally called banana chips is produced by using flesh of unripe bananas having a solid texture and a total sugar content of as small as less than about 2% by weight as a starting material, and drying the flesh after subjecting the flesh to a blanching treatment with hot water or steam, and/or after immersing the flesh in a solution of $SO_2$ or another sulfur dioxide generating agent or a solution of a browning inhibitor such as aluminum chloride, citric acid or ascorbic acid.

Naturally, the resulting dried banana products obtained lack the sweet taste, the unique flavor, the unique color, etc. which are inherent to ripe raw bananas. The banana products are therefore processed further by, for example, treating the products with a solution of sugar and/or a gelatinous substance, or adding artificial flavors, dyes, etc. to enhance their flavor and color before they are marketed as final products.

On the other hand, products generally called banana powder or banana flakes are made from ripe bananas as a starting material. In order to facilitate drying, the bananas are mashed into a paste form, and then dried using a method such as foam mat drying, drum drying or low-temperature vacuum drying. These products do not have the original shape of a banana, and differ markedly from the dried banana products which are obtained by the process of the present invention.

SUMMARY OF THE INVENTION

An object of this invention is to provide a process for producing a dried banana product having a superior flavor, a crisp texture and good storage stability from fully ripe banana flesh as a starting material.

The object of this invention is achieved by a process for producing a dried banana product, which comprises frying slices of fully ripe raw banana flesh in an edible oil as rapidly as possible after slicing while substantially maintaining a pressure of about 30 to about 60 Torr and a frying temperature of about 75° to about 85° C. to dehydrate the slices;

removing the banana flesh slices from the frying oil while still maintaining a pressure of about 30 to about 60 Torr;

removing the excess frying oil adhering to the banana slices while still maintaining a pressure of about 30 to about 60 Torr; and thereafter allowing the reduced pressure to return to atmospheric pressure.

DETAILED DESCRIPTION OF THE INVENTION

The fully ripe raw banana flesh used as a starting material in this invention may be the flesh of any desired banana varieties, but generally, bananas of the Gross-Michel variety and the Cavendish variety are used. The degree of ripening of the banana flesh is such that the surface banana skin is completely yellow, or is yellow with some brown spots. Also the flesh of those bananas which are somewhat unripe and taste harsh when eaten raw can be used in the present invention. Usually, however, such bananas are not desirable since the harshness of the taste remains even after the flesh is dried. Bananas which can be conveniently used as starting materials in the present invention have a total sugar content of at least about 18% by weight, this sugar content being a measure of ripeness sufficient for use in this invention. Raw banana sugar content can be determined by total sugar in the banana as described in *The Chemistry and Technology of Food and Food Products,* Volume II, pages 1544 Table CXXVIII.

The starting bananas are first peeled, e.g., by hand. Then, the banana pulp or flesh is cut into the desired shape to a thickness of about 1 to about 5 mm, preferably 2 to 3 mm, e.g., using a sharp knife or similar cutting means, preferably made of stainless steel. Conveniently and preferably, the banana is cut crosswise into round slices. The banana flesh can also be cut parallel to the longitudinal axis, of the banana, and if required, the banana can be further sliced crosswise. When the thickness of the slices exceeds about 5 mm, the slices cannot be dried to a water content of about 1 to 3% without causing their surface and core to discolor, especially the core to discolor. When the thickness of the slices is less than about 1 mm, the slices tend to deform, and the final dried products may have an increased oil content or tend to break easily.

The banana flesh slices are as rapidly as possible after slicing placed in a frying vessel, preferably a closure-equipped foraminous basket-like vessel, e.g., made of wire mesh or punched-out metal, with care being taken not to deform the slices. When enzymes present in the banana cells which have been broken on the cut surfaces of the banana flesh slices come into contact with oxygen in the air, the texture of the banana is softened, and a browning reaction takes place. For this reason, the time between the cutting of the banana flesh and the contacting of the slices with a hot frying oil should preferably be as short as possible. Good results can generally be obtained when the banana flesh slices are contacted with the frying oil within about 20 minutes, preferably within 15 minutes, from the time the banana slices are cut.

When the banana flesh slices are placed in the frying vessel, the height of the banana flesh slices preferably is not more than about 50 mm. This is for the purpose of (1) preventing the slices having a soft texture from being deformed by their own weight, (2) preventing deformation and/or mutual adhesion of the banana flesh slices by leaving room for the slices to move in the frying oil upon rising to the surface of the oil, and (3) preventing the banana slices from deforming at the time the frying oil is removed after dehydration, at which time the banana slices still have a temperature near the temperature of the frying oil and are flexible.

The frying vessel containing the banana flesh slices is put into a tank for reduced-pressure frying. The tank is equipped with means for heating the frying oil, means for reducing pressure inside of the tank, and a means for removing the excess frying oil. One example of such a heating means is a jacketed heating device. Preferably, the tank is equipped with a heat exchanger for supplying and recycling the heated frying oil. An example of an oil removing means is a centrifugal separator capable of rotating the frying vessel.

The frying vessel is placed in the frying tank, and the frying tank is closed. Then, the pressure of the inside of the tank is reduced and maintained at about 30 to about 60 Torr. An edible oil e.g., rice oil, hardened palm oil, hardened coconut oil, as the frying oil may be put into the tank beforehand, or supplied to the tank during the pressure reducing step. Or the oil can be supplied to the tank after the inside of the tank has attained the reduced pressure desired. In this way, the banana flesh slices are contacted with the frying oil.

Reduced pressures of less than about 30 Torr are not easily obtained when a conventional cooling water condenser is used, and such a degree of pressure reduction is not required to achieve the object of this invention. On the other hand, at a pressure in excess of about 60 Torr, the banana flesh slices cannot be dried to a water content of about 1 to 3% without browning occurring in the absence of a browning inhibitor or an antioxidant.

Frying of the banana flesh slices is performed under the reduced pressure conditions described above while maintaining the frying oil at a temperature of about 75° to about 85° C. Temperatures outside this range are not desirable. If the oil temperature is lower than about 75° C., the viscosity of the frying oil increases, and long periods of time are required for dehydration, thus causing the oil content of the dried product to increase. If the oil is maintained at a temperature higher than about 85° C., a Maillard reaction takes place between the sugars and amino acids contained in the banana, and a browning of the product occurs. Browning becomes pronounced particularly at the core area of the banana flesh slices. If the oil temperature exceeds about 110° C., excessive foaming of the soft banana flesh slices causes deformation or rupture of the product.

Even when the oil temperature is below about 75° C., if the pressure is maintained at below about 30 Torr, dried banana products having a water content of about 1.5 to 3.0% can be obtained. However, since enzymes in the products still remain active, enzymatic browning of the product during storage tends to occur.

When frying is begun, the temperature of the frying oil tends to decrease due to the evaporation of water from the banana flesh slices and due to the heat absorption by the banana flesh slices. It is therefore, necessary, to heat the frying oil suitably so as to maintain the temperature of the frying oil within the above-specified range. The level of the oil surface should be such that when the water in the banana flesh slices boils and foaming occurs, the slices do not reach the closure of the frying vessel.

The frying time should be determined on consideration of various factors such as the thickness and diameter of the banana flesh slices, the temperature of the frying oil, and the pressure within the frying tank. Usually, the frying time is about 15 to about 40 minutes.

During the frying, the banana flesh slices rise to the oil surface, and more about while foaming occurs. During the frying, when the frying vessel is completely submerged in the oil or the banana flesh slices are submerged in the oil by using a wire net lid, the level of which is adjustable in the frying vessel, the banana flesh slices which tend to rise to the surface of the oil will be compressed by the wire net lid or by the closure or inner wall of the vessel. This results in a deformation of the banana slices or in a non-uniformly dehydrated condition. In addition, the steam which comes from the banana flesh slices urges the banana slices against opening portions such as the wire net or the closure or inner wall of the vessel to clog these portions. Consequently, the inside pressure of the frying vessel is increased, as a result, to drastically reduce the effect of frying under reduced pressure, and the product is markedly discolored.

When foaming of the banana flesh slices has almost subsided, and the frying comes to an end, the banana slices are separated from the frying oil, e.g., pulling up the frying vessel from the frying oil or discharging the frying oil from the tank by a pump or the like, while the reduced pressure condition described above is still maintained. Then, the excess of the frying oil adhering to the banana slices is removed. Removal of the excess oil can be achieved, for example, by using a centrifugal separator which rotates the frying vessel, or a vibrator device which vibrates or taps the frying vessel.

During removal of the excess of the frying oil, the banana slices still have some flexibility because they still have a temperature near the temperature of the frying oil. Accordingly, the removal of the excess oil should be performed under conditions such that deformation or damage to the banana flesh slices will not occur. For example, when the oil removal is performed by centrifugal separation, the peripheral linear speed of the frying vessel is preferably about 200 to about 300 m/min.

Thus, when the excess of the frying oil has not been removed sufficiently, the dried banana product has an oil content of more than about 25%. Thus, the product is greasy and not tasty. On the other hand, when an oil content of less than about 18% is desired, an efficient operation for removal of the frying oil is needed and consequently the product tends to be deformed or damaged.

After removing the excess of the frying oil, the reduced pressure is released, and returned to atmospheric pressure. Then, the fried dry banana product is taken out of the frying vessel. The dried banana product thus obtained has a water content of about 1 to about 3%, and an oil content of about 18 to about 25%.

To achieve the objects of this invention, the steps set forth above should be performed in the sequence described. If the reduced pressure is released before the fried banana slices have been separated from the frying oil, the frying oil will be forced into voids within the tissues of the banana slices, and it will be impossible to remove the excess of the frying oil with good efficiency. Also, if an attempt is made to remove the excess oil from the banana slices after separating the banana slices from the frying oil, releasing the reduced pressure and then taking the banana slices out of the frying tank, it is impossible to achieve sufficient oil removal because the frying oil penetrates into the tissues of the banana flesh and the efficiency of removal is reduced.

The process of this invention makes it possible to produce a dried banana product having a good color and good storage stability from slices of fully ripe raw banana flesh as a starting material which are susceptible to crumbling or deformation because of their soft and weak texture. What is noteworthy is that this can be achieved without using browning inhibitors, antioxidants, etc., some of which are toxic or hazardous to humans or are likely to impair the flavor and taste of the banana. The final dried banana product substantially retains the shape and size attained at the time of slicing the starting material into the desired shape. The product has a crisp texture and a superior flavor and taste.

The following Examples are given to illustrate the present invention in more detail.

EXAMPLE 1

Bananas of the Cavendish variety which were fully ripe, whose skins were yellow with no tint of green, were peeled, and cut crosswise into round slices each having a thickness of 2 mm using a stainless steel knife to obtain 200 g of banana flesh slices. With care taken not to deform the banana slices, they were rapidly placed and stacked in a closure-free frying basket made of wire mesh to a layered thickness of about 30 mm.

Purified rice oil (4 kg) was put into a reduced-pressure frying tank equipped with a steam jacket, a cooling water condenser and a vacuum pump, and the oil was heated to 80° C. by the steam jacket. The frying basket cotaining the banana flesh slices was then placed in the tank and the banana flesh slices were contacted with the frying oil. The time between the peeling of the bananas and the contact of the slices thereof with the frying oil was about 4 minutes.

The frying tank was sealed, and the pressure was reduced. The frying oil was heated so as to maintain its temperature at 80° C. The banana slices immediately began to foam, and rose to the frying oil surface. In about 3 minutes, the pressure was reduced to about 60 Torr. Heating was continued to maintain the oil temperature at 80° C. The banana slices moved about on the foaming oil surface. The pressure inside the tank gradually decreased, and reached 30 Torr in about 10 minutes. After the frying had been performed for about 23 minutes, the foaming almost subsided. While maintaining the reduced pressure level, the basket was pulled up from the frying oil, and the frying oil was allowed to drip from the banana slices for 2 minutes. Then, the basket was vibrated electrically to remove the excess of the frying oil adhering to the banana slices. Then, the pressure was returned to atmospheric pressure, and 58 g of a dried banana product was obtained.

Analysis of the dried banana product showed that the product had a water content of 1.8% and an oil content of 24%. The dried banana product was a tasty product with a crisp texture, and the shape, size, color, flavor and taste which the banana slice had just after slicing were substantially maintained.

EXAMPLE 2

Bananas of the Gross-Michel variety, whose surface skin was completely yellow with some brown spots, were peeled, and cut crosswise into round slices with a thickness of 3 mm using a slicer having a stainless steel blade to obtain 10 kg of banana flesh slices.

With care taken not to deform the banana flesh slices, they were rapidly placed and stacked to a layered thickness of about 45 mm in a closure-equipped frying basket made of punched out metal, and the basket was closed.

The frying basket was placed in a reduced-pressure frying tank equipped with a steam jacket, a cooling water condenser, a vacuum pump, a pump for supplying and discharging the frying oil, and a rotating shaft for rotating the frying basket. The frying tank was sealed, and the pressure inside the tank was reduced to about 60 Torr.

Then, about 50 kg of purified hardened palm oil heated to 80° C. was fed into the frying tank to contact the oil with the banana flesh slices. The time between the peeling of the banana and contact of the banana flesh slices with the frying oil was about 10 minutes.

Immediately, heating with the steam jacket was started. The temperature of the oil was maintained, and the pressure was maintained at about 60 Torr. The banana slices rose to the oil surface and moved about with foaming. The pressure inside the tank gradually decreased, and reached 30 Torr in about 7 minutes. After frying for about 25 minutes, the foaming had almost subsided.

While maintaining the reduced pressure level, the frying oil was withdrawn by the pump. Then, the frying basket was rotated, and the excess frying oil was centrifugally removed from the banana slices at about 120 rpm for about 2 minutes. The pressure was then returned to atmospheric pressure, and 2.6 kg of a dried banana product was obtained.

Analysis of the resulting dried banana product showed that the product had a water content of 2.0% and an oil content of 20%. The dried banana product had a crisp texture, and the shape, size, color, flavor and taste which the banana flesh slices had just after slicing were substantially maintained.

EXAMPLE 3

The dried banana product obtained in Example 1 was tested periodically for a variation in color by accelerated moisture absorption.

The dried banana product was pulverized in a mortar, and 3 g of the resulting powder which passed through a 14-mesh sieve (according to ASTM: E11-58T) was placed in a cell of a color and color difference meter (type ND-K68, a product of Nippon Denshoku Kogyo K.K.) and allowed to stand at a temperature of 20° C. and a relative humidity of 80%. The lightness (L) and saturation (R) of the powder were measured periodically. Larger L values show more lightness, and larger R values show more reddish colors.

For comparison, dried banana products obtained by different methods were tested in the same way. The results obtained are shown in Table 1 below.

TABLE 1

| Sample | Water Content (%) | Storage Time (hrs) | | | | | | | | |
|---|---|---|---|---|---|---|---|---|---|---|
| | | 0 | | 12 | | 24 | | 36 | | 48 | |
| | | L | R | L | R | L | R | L | R | L | R |
| 1 | 1.3 | 65.2 | 0 | 60.0 | 0.1 | 54.5 | 0.2 | 49.0 | 0.6 | 44.0 | 1.3 |
| 2 | 1.2 | 57.2 | 3.7 | 52.2 | 4.1 | 47.5 | 4.4 | 44.5 | 5.0 | 42.1 | 5.6 |
| 3 | 1.2 | 67.7 | 2.1 | 62.5 | 2.4 | 55.2 | 2.6 | 48.0 | 3.5 | 40.9 | 4.4 |
| 4 | 1.2 | 65.0 | 0.4 | 61.0 | 0.6 | 58.4 | 0.8 | 54.5 | 1.1 | 52.7 | 1.4 |

Note
Sample 1: The product obtained by the method of Example 1.
Sample 2: A product obtained by immersing banana flesh slices having a thickness of 2 mm in a 0.3% aqueous solution of ascorbic acid for 1 minute, and then frying them at 105° C. and 20 to 60 Torr for 15 minutes.
Sample 3: A product obtained by immersing banana flesh slices having a thickness of 2 mm in a 0.3% aqueous solution of ascorbic acid for 1 minute, and then frying them under the same conditions as in Example 1.
Sample 4: A product obtained in the same manner as in the preparation of Sample 3 except that a 0.03% aqueous solution of sodium sulfite was used instead of the ascorbic acid aqueous solution.

As is clear from the results in Table 1 above, the product obtained by the process of this invention showed a better color than the products obtained by pre-treating the starting materials with a browning inhibitor (ascorbic acid) and then frying them under the same reduced pressure as in the process of this invention but at a frying temperature higher than that specified in the present invention, despite the fact that the product of the present invention was not pre-treated with a browning inhibitor. These results also demonstrate that the product in accordance with this invention showed more resistance to browning due to moisture absorption during storage than the other products.

While the invention has been described in detail and with reference to specific embodiments thereof, it will be apparent to one skilled in the art that various changes and modifications can be made therein without departing from the spirit and scope thereof.

What is claimed is:

1. A process for producing a dried banana product, which comprises;

frying slices of about 1 to 5 mmm thickness of fully ripe raw banana flesh in an edible oil as rapidly as possible, but within 20 minutes after slicing, without a prior treatment with a browning inhibitor, while substantially maintaining a pressure of about 30 to about 60 Torr and a frying temperature of about 75° to about 85° C. to dehydrate the slices;

separating the banana slices from the frying oil while still maintaining a reduced pressure of about 30 to about 60 Torr;

removing the excess frying oil adhering to the banana slices while still maintaining a pressure of about 30 to about 60 Torr; and thereafter releasing the reduced pressure to return the pressure to atmospheric pressure.

2. The process of claim 1, wherein the process is performed until the banana slices substantially have a water content of about 1 to 3%, and a dried banana product having an oil content of about 18 to 25% is obtained.

* * * * *